United States Patent [19]

Manser et al.

[11] Patent Number: 4,707,540

[45] Date of Patent: Nov. 17, 1987

[54] NITRAMINE OXETANES AND POLYETHERS FORMED THEREFROM

[75] Inventors: Gerald E. Manser, Folsom; Richard W. Fletcher, Fair Oaks, both of Calif.

[73] Assignee: Morton Thiokol, Inc., Chicago, Ill.

[21] Appl. No.: 825,658

[22] Filed: Oct. 29, 1986

[51] Int. Cl.$^4$ .............................................. C08G 65/22
[52] U.S. Cl. .................................... 528/417; 528/361; 528/362; 549/510
[58] Field of Search ...................... 528/417, 362, 361; 549/510

[56] References Cited

U.S. PATENT DOCUMENTS

| | | | |
|---|---|---|---|
| 4,250,294 | 2/1981 | Hagel et al. | 528/417 X |
| 4,268,450 | 5/1981 | Frankel et al. | 528/417 X |
| 4,414,384 | 11/1983 | Berkowitz et al. | 528/417 |
| 4,483,978 | 11/1984 | Manser | 528/408 |

Primary Examiner—Earl Nielsen
Attorney, Agent, or Firm—Wayne E. Nacker; Gerald K. White

[57] ABSTRACT

Nitramine oxetanes, specifically 3-methyl nitraminomethyl-3-methyl oxetane and 3,3-Bis (methyl nitraminomethyl) oxetane are synthesized. Polyethers are formed incorporating the nitramine oxetanes, which polyethers are curable with isocyanates to form elastomers suitable for use as binders in propellants or the like.

8 Claims, No Drawings

NITRAMINE OXETANES AND POLYETHERS FORMED THEREFROM

The Government has rights in this invention pursuant to Office of Naval Research Contract N00014-82-C-0800.

The present invention is directed to a novel class of oxetane compounds having side chain groups containing nitramine moieties and the use of these oxetanes in forming polyethers useful in formulating propellant binders or the like.

BACKGROUND OF THE INVENTION

High-energy solid compositions, such as propellants, explosives, gasifiers or the like comprise an elastomeric binder in which is dispersed particulate solids, such as particulate fuel material and/or particulate oxidizers. The formulations may also include a liquid plasticizer, such as a nitrate ester plasticizer, which contributes to the elastomeric characteristics of the binder and adds additional energy to the composition. Typical elastomers used in binder systems for high-energy compositions include polyethylene glycol, polycaprolactone and cross-linked hydrocarbon polymers.

It is desirable in many propellant and explosive applications that the binder system itself be as high energy as possible, and it has been proposed to formulate high-energy elastomers from high-energy polyethers and appropriate curatives. U.S. Pat. No. 4,483,978 issued to Manser describes high-energy polyethers formed from oxetanes containing high-energy nitro or nitrato groups. The polyethers may also include tetrahydrofuran (THF) and tetrahydrofuran derivatives.

Generally, polyethers should form elastomers with high energy and good elastomeric and strength characteristics. If the binders are to be used in conjunction with a nitroester plasticizer, nitroester-miscibility is further required. In addition to contributing energy to polyethers and the elastomers formed therefrom, high-energy pendant groups affect the physical properties of the polyethers, e.g., viscosity, and also affect nitroester miscibility. In addition, different high-energy pendant groups can be expected to contribute slightly different burn characteristics to propellant compositions.

There exists a need for novel high-energy oxetanes in the propellant and explosive industry and for novel polyethers containing mer units derived from such oxetanes.

SUMMARY OF THE INVENTION

In accordance with the present invention, novel oxetanes are produced having side-chain groups containing nitramine moieties. In particular, the novel compounds 3-methyl nitraminomethyl-3-methyl oxetane (MNAMMO) and 3,3-Bis(methyl nitraminomethyl) oxetane (BMNAMO) are synthesized, and these compounds are polymerized to form polyethers useful for forming elastomers that form the basis of binder systems. The polyethers formed from the nitramine oxetanes exhibit excellent thermal stability and are particularly useful for forming high-energy binders where thermal stability is of particular concern. The nitramine groups not only provide high energy, but also act as oxidizers, and may be selected in particular propellant or explosive systems for this oxidizing potential.

DETAILED DESCRIPTION OF CERTAIN PREFERRED EMBODIMENTS

Novel oxetanes are produced having side chain groups containing nitramine moieties. In particular, oxetanes are produced having the general formula:

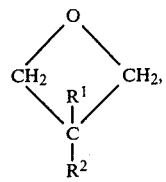

wherein at least one of $R^1$ and $R^2$ have the formula $(CH_2)_n$—$N(NO)_2$—A, wherein n is at least 1 and A is —H or an alkyl group, and $R^2$ is $(CH_2)_n$—Y wherein Y is —H, alkyl, —N(NO_2)—A, —N_3,

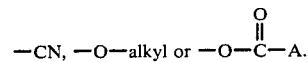

In accordance with specific embodiments of the present invention, the following novel oxetanes are produced: 3-methyl nitraminomethyl-3-methyl oxetane having the formula:

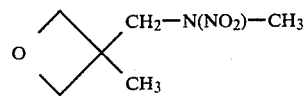

and 3,3-Bis(methyl nitraminomethyl) oxetane having the formula:

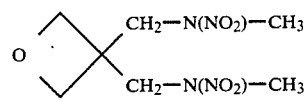

The conventional conversion of amines to nitramines involves the nitration of the amine directly to the nitramine using nitric acid; however, it is found that nitramine oxetanes cannot be produced directly by nitration of the corresponding amine with nitric acid because this invariably results in ring opening. The conditions of nitramine oxetane synthesis must proceed under sufficiently mild conditions that excessive ring opening does not occur.

In accordance with a synthetic method of the invention, an oxetane having the general formula:

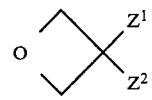

wherein at least one of $Z^1$ and $Z^2$ have the formula $(CH_2)_n$—X, wherein n is at least 1 and X is a halide, e.g., I, Br or Cl, is reacted with a nitramine salt having the general formula: $M(N(NO_2)A)_z$ ($z=1-3$), wherein M is a cation, preferably a monovalent cation ($z=1$) and A is —H or an alkyl group, to produce the corresponding nitramine oxetane.

The reaction of 3-iodomethyl-3-methyl oxetane to produce 3-methyl nitraminomethyl-3-methyl oxetane by this synthetic procedure proceeds as follows:

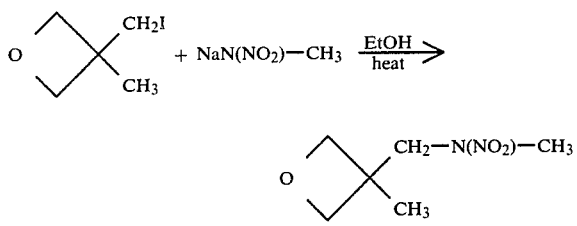

3,3-Bis(iodomethyl) oxetane is converted to 3,3-Bis(-methyl nitraminomethyl) oxetane in analogous fashion.

The nitramine oxetanes are particularly useful for polymerizing to form polyethers, which polyethers may be subsequently cured to form binder material.

When polymerized, the resulting polyether contains mer units having the formula:

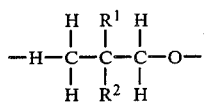

wherein $R^1$ and $R^2$ are as defined above.

Polyethers in accordance with the invention may be homopolymers of nitramine oxetanes, as defined above, but may also be copolymers or higher number polymers containing up to about 90 molar percent of one or more monomers derived from cyclic ethers having the general formula:

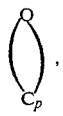

wherein $C_p$ represents saturated ring carbons and p is between 2 and 4. That is, polyethers in accordance with the present invention contain between about 10 and 100 molar percent of nitramine-containing mers as described above. The cyclic ethers which may be copolymerized with the nitramine-containing oxetanes include other oxetanes (p=3); ethylene oxide (p=2) and tetrahydrofuran and its derivatives (p=4). The comonomer(s) may contain a variety of pendant groups tailored to the requirements of the binder elastomer, having functional moieties, including, but not limited to, cyano, alkyl, nitrato, nitro, azido, alcohol, ether and ester groups. The comonomers yield mer units having the general formula:

Polyethers are formed from the cyclic ether monomers by cationic polymerization. Generally, an initiator is formed from an adduct of a substance, such as a diol, e.g., 1,4-butane diol (BDO), and a catalyst for cationic polymerization, e.g., BF3-etherate. A number of suitable organic compounds and catalysts which may be used to form initiator adducts for cyclic ether polymerization are described in U.S. Pat. No. 4,393,199, the teachings of which are incorporated herein by reference. The initiator reacts with one of the available monomers to form an initiating species, and polymerization proceeds by chain elongation until the supply of available monomers is substantially, e.g., over 85%, exhausted.

The length of the polyethers is generally a function of initiator concentration relative to available monomers with the average length of the chain being approximately the number of available monomer molecules divided by the number of initiator adducts. Generally, polyethers used in binders are tailored to have number average molecular weights of from about 2,000 to about 20,000, although lower molecular weight polyethers may be preferred for certain purposes. Polydispersity of polyethers formed in accordance with the present invention range from about 1.5 to about 2.5. Generally, the molar ratio of mer units in the polyether which is formed reflects the molar ratios of available monomers; however, in some cases, there may be considerable divergence, e.g., if one of the monomeric species is considerably less reactive in the polymerization reaction.

The polymerization reaction may be performed in a suitable solvent, such as methylene chloride. Alternatively, if one of the monomers, e.g., THF, serves as a solvent, the polymerization may be carried out in the absence of additional solvent.

Elastomers are formed from the polyethers by curing with isocyanates having a functionality of at least two, e.g., toluene diisocyanate. To promote chain elongation, at least one equivalent of an isocyanate is required. Preferably, cross-linking is also promoted, for example, by using an isocyanate of higher functionality or by adding a separate cross-linking agent, such as trimethylolethane. A cross-linked density of at least about 10% is generally preferred in an elastomer to be used in a binder. When propellant or explosive grains are produced, curing is effected in the presence of the solids and the plasticizers, whereupon, the solids and plasticizers are dispersed and immobilized throughout the cured binder.

Herein, nitroester-compatibility refers to compatibility with materials commonly used as plasticizers in propellant binders. These include, but are not limited to nitroglycerin (NG); mono di and triethyleneglycol dinitrate; butanetriol trinitrate (BTTN); and trimethylolethane trinitrate (TMETN).

The invention herein is intended to encompass plasticized binders in high-energy compositions, such as propellant grains. Plasticized binders comprise a nitrate ester plasticizer plus an isocyanate-cured polyether as described above, the wt. ratio of plasticizer to cured binder is up to about 2.5:1.

The invention herein is further intended to encompass high-energy compositions, such as propellant compositions. The propellant compositions comprise between about 70 and about 90 wt. percent particulate solids, including fuel material particulates and oxidizer particulates and the balance substantially all nitrate ester-plasticized elastomer having a plasticizer to cured elastomer weight ratio of up to about 2.5:1. A typical particulate fuel material is aluminum. Particulate oxidizer materials include but are not limited to ammonium perchlorate (AP), cyclotetramethylene tetranitramine (HMX), cyclotrimethylene trinitramine (RDX), and mixtures thereof.

Various aspects of the invention will now be described in greater detail by way of specific examples.

EXAMPLE 1

Theoretical heats of formation of experimental polymers are given below in Table 1.

TABLE 1

| Polymer System | Heat of Formation | |
|---|---|---|
| | Cal/gm | Kcal/mole |
| PEG | −999 | −99.9 |
| AMMO | +207 | +26 |
| BAMO/THF | +209 | +50.2 |
| BAMO/AMMO | +244 | +72.1 |
| BAMO | +685 | +112 |
| BAMO/NMMO | — | +3.9 |
| BAMO/NMMO | +24 | +9 |
| BNMO/NMMO | −460 | −163 |
| BNMO | −466 | −97 |
| NMMO | −643 | −94.7 |
| MNAMMO | — | −49.7 |
| BMNAMO | −255 | −45.6 |
| MNAMMO/NMMO | −469 | −144 |
| MNAMMO/AMMO | −0.04 | −12 |

PEG = polyethylene glycol;
AMMO = azidomethylmethyl oxetane;
BAMO = bis(azidomethyl)oxetane;
BNMO = bis(nitratomethyl)oxetane;
NMMO = nitratomethylmethyloxetane;
THF = tetrahydrofuran;
MNAMMO = methylnitraminomethylmethyl oxetane;
BMNAMO = bis(methylnitraminomethyl)oxetane.

EXAMPLE 2

The increase in performance of propellants relative to PEG using these theoretical heats of formation are given in Table 2:

TABLE 2

| Increase in $I_{sp}$ Of An Experimental Ballistic Propellant | | |
|---|---|---|
| Polymer System | O/F Ratio | Delta $I_{sp}$ |
| PEG | 1.068 | 0.0 |
| BAMO/AMMO 50/50 | 1.053 | 1.4 |
| BAMO/THF 50/50 | 1.047 | 1.7 |
| BNMO/BAMO 50/50 | 1.122 | 1.8 |
| BNMO/NMMO 50/50 | 1.147 | 1.3 |
| NMMO | 1.115 | 0.7 |
| BAMO/NMMO 70/30 | 1.096 | 2.2 |
| MNAMMO | 1.082 | 1.6 |
| BMNAMO | 1.114 | 1.8 |
| MNAMMO/NMMO 50/50 | 1.099 | 1.2 |
| MNAMMO/AMMO 50/50 | 1.065 | 1.8 |

EXAMPLE 3

3-Iodomethyl-3-methyloxetane

In a 2 liter, three-neck flask, fitted with a stirrer, reflux condenser, and thermometer, were placed 1000 ml of methylethylketone, 374 g (2.5 mole) of sodium iodide, and 242 g (2 mole) of 3-chloromethyl-3-methyloxetane. The mixture was heated to reflux for 24 hr and cooled to room temperature. The precipitated sodium chloride was filtered off, and 800 ml of methylene chloride was added to the filtrate. The solution was washed three times with a dilute water solution of sodium thiosulfate to reduce any free iodine, followed by a distilled water wash. The organic layer was dried over magnesium sulfate. After removing the solvent by evaporation, the product was distilled; the fraction boiling at 92° C and 23-mm Hg pressure was collected. The yield was 350 g (82 percent).

EXAMPLE 4

3,3-Bis(iodomethyl)oxetane

In a 1 liter, three-neck flask, fitted with a stirrer, a reflux condenser, and thermometer, were placed 500 ml of methylethylketone, 360 g (2.4 mole) of sodium iodide, and 155 g of 3,3-bis (chloromethyl)oxetane. The mixture was heated to reflux for 24 hr and cooled to room temperature. The precipitated sodium chloride was filtered off, and 400 ml of methylene chloride was added to the filtrate. The solution was then washed three times with a dilute water solution of sodium thiosulfate to reduce any free iodine, followed by a distilled water wash. The organic layer was dried over magnesium sulfate and filtered. The solvent was removed by evaporation, and the crude produce was recrystallized from hexanes. A yield of 200 g was obtained.

EXAMPLE 5

3-methyl nitraminomethyl-3-methyloxetane (MNAMMO)

In a 2 liter, three-neck flask fitted with a stirrer, thermometer, and reflux condenser, were placed 1000 ml of ethanol, 120 g (1.22 mole) of sodium methylnitramine, and 204 g (0.96 mole) of 3-iodomethyl-3-methyl-oxetane. The mixture was heated to reflux and allowed to react for 4 days. The flask was then cooled in a refrigerator before filtering off the sodium iodide. Two liters of methylene chloride were added to the filtrate, and the solution was washed three times with a dilute water solution of sodium thiosulfate to reduce any free iodine. After a wash with distilled water, the organic layer was dried over magnesium sulfate and the solvent removed by evaporation at room temperature and 0.3-mm pressure. The crude product was passed through a neutral-/alumina column using 50/50 vol/vol chloroform/hexanes.

NMR: 1.41(s,CH$_3$C); 3.45(s,CH$_3$N); 4.0(s,CH$_2$N): 4.33,4.62 (ABq,CH$_2$O) J=6

EXAMPLE 6

3,3-Bis(methyl nitraminomethyl)oxetane (BMNAMO)

In a 1 liter, three-neck flask fitted with a stirrer, thermometer, and reflux condenser were placed 500 ml of ethanol, 37 g (0.38 mole) of sodium methylnitramine, and 51 g (0.15 mole) of 3,3-bis(iodomethyl)oxetane. The mixture was heated to reflux and allowed to react for 5 days. The flask was cooled, and 300 ml of water was added followed by enough methylene chloride to get a good separation of the liquid layers. The water layer was removed and the organic layer washed twice with a dilute water solution of sodium thiosulfate followed by a pure water wash. The organic layer was dried over magnesium sulfate, and the solvent was removed by evaporation. The crude produce was then titorated with boiling chloroform and allowed to cool overnight. A white crystalline precipitate of the pure product was obtained.

MNR(CDCCl$_3$+TMS): 3.43(s,CH$_3$); 4.1(s,CH$_2$N); 4.43(s,CH$_2$O) Melting Point 129 to 131° C.

EXAMPLE 7

PolyBMNAMO/MNAMMO, polyMNAMMO, polyAMMO/MNAMMO, and poly NMMO/MNAMMO were synthesized generally as follows by solution polymerization.

100 g of calcium hydride-dried methylene chloride is charged into a flame-dried, 500 ml resin flask which is maintained under a nitrogen atmosphere. To this flask is then added the calculated amount of freshly distilled 1,4-butanediol (BDO) followed by the calculated amount of borontrifluoride-etherate (1:2 mole ratio). This solution is allowed to react for 1 hour at room temperature. The reactor is then cooled to −10° C., and after 30 minutes a solution of the monomer(s) is added dropwise in methylene chloride (25 percent w/w concentration). The rate of addition usually ranges from 20 minutes to 2 hours. If the rate of polymerization is unknown, the reaction is followed by gas chromatography (GC), until a coversion of greater than 90 percent is measured. At this time, the contents of the flask are quenched with 50 ml of saturated brine solution. The organic phase is separated off, washed with 10-percent sodium bicarbonate solution, dried over magnesium sulfate, and evaporated to dryness at room temperature. The nature of the polymer dictates the method of purification. In most cases, a single precipitation from cold methanol yields an acceptable polymer. Each of these polymers was synthesized for initial evaluation to a molecular weight of about 5,000 functionality of about 2.

EXAMPLE 8

PolyMNAMMO, MW 5000 was a liquid polymer; however, after standing at room temperature for 1 week it reverted to a wax. Therefore, the introduction of second monomers to reduce stereoregularity is advantageous. Nevertheless, the thermal stability of this homopolymer was examined by differential scanning calorimity. It was found that a steady and flat baseline was produced up to 261° C., at which time a strong exotherm was noted, peaking at 279° C. Thus, as expected, the pure nitramine-substituted polyether exhibits extremely good thermal stability and decomposes as a typical nitramine.

EXAMPLE 9

PolyMNAMMO, MW 5000 is used to prepare a propellant formulation of 79% solids, including 19% powdered aluminum (Al), 10% ammonium perchlorate (AP) and 50% cyclotetramethylene tetranitramine (HMX). The remainder comprises nitroglycerine and sufficient polyether to provide a final plasticizer to polymer wt. ratio of 2.0:1. The ingredients are thorougly blended in a Banbury mixer. The propellant mixture is cured by mixing with trimethylolethane to achieve a cross-link density of 10% and then condensed with one equivalent of toluene diisocyanate. The propellant formulation is cured for 24 hours at 65° C.

While the invention has been described in terms of certain preferred embodiments, modifications obvious to one with ordinary skill in the art may be made without departing from the scope of the present invention.

Various features of the inventions are set forth in the following claims.

What is claimed is:

1. A nitramine oxetane having the formula:

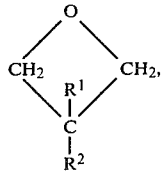

wherein at least one of $R^1$ and $R^2$ have the formula $(CH_2)_4$—$N(NO)_2$—A, wherein n is at least 1 and A is —H or an alkyl group, and $R^2$ is $(CH_2)_n$—Y wherein Y is —H, alkyl, —N(NO$_2$)—A, —N$_3$,

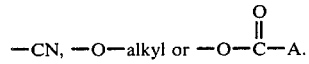

2. An oxetane according to claim 1 wherein said oxetane is selected from the group consisting of 3-methyl nitraminomethyl-3-methyl oxetane and 3,3-Bis(-methylnitraminomethyl) oxetane.

3. A polyether having mer units derived from cyclic ethers having the general formula:

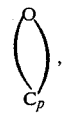

wherein $C_p$ represents saturated ring carbons and p is between 2 and 4, from about 10 molar percent to 100 percent of the mer units being derived from a nitramine oxetane having the formula:

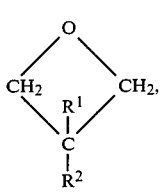

wherein at least one of $R^1$ and $R^2$ have the formula $(CH_2)_n$—$N(NO)_2$—A, wherein n is at least 1 and A is —H or an alkyl group, and $R^2$ is $(CH_2)_n$—Y wherein Y is —H, alkyl, —N(NO$_2$)—A, —N$_3$,

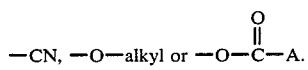

4. a polyether according to claim 3, wherein said nitramine oxetane is selected from the group consisting of 3-methyl nitraminomethyl-3-methyl oxetane and 3,3-Bis(methyl nitraminomethyl) oxetane and mixtures thereof.

5. A elastomer comprising a polyether having mer units derived from cyclic ethers, having the general formula:

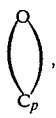

wherein $C_p$ represents saturated ring carbons and p is between 2 and 4, from about 10 molar percent to 100 percent of the mer units being derived from a nitramine oxetane having the formula:

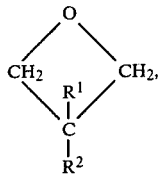

wherein at least one of $R^1$ and $R^2$ have the formula $(CH_2)_n$—$N(NO)_2$—A, wherein n is at least 1 and A is —H or an alkyl group, and $R^2$ is $(CH_2)_n$—Y wherein Y is —H, alkyl, —H, alkyl, —$N(NO_2)$—A, —$N_3$, —CN,

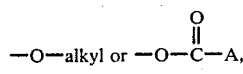

an isocyanate having a functionality of 2 or greater curing said polyether.

6. A propellant composition comprising between about 70 and about 90 wt. % solids, including fuel material particulates and/or oxidizer particulates, balance consisting essentially of a binder system comprising an elastomer and optionally a plasticizer with a plasticizer to elastomer ratio of up to about 2.5:1, said elastomer elastomer comprising a polyether having mer units derived from cyclic ethers, having the general formula:

wherein $C_p$ represents saturated ring carbons and p is between 2 and 4, from about 10 molar percent to 100 percent of the mer units being derived from a nitramine oxetane having the formula:

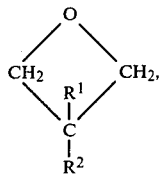

wherein at least one of $R^1$ and $R^2$ have the formula $(CH_2)_n$—$N(NO)_2$—A, wherein n is at least 1 and A is —H or an alkyl group, and $R^2$ is $(CH_2)_n$—Y wherein Y is —H, alkyl, —H, alkyl, —$N(NO_2)$—A, —$N_3$, —CN,

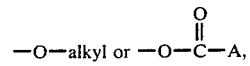

an isocyanate having a functionality of 2 or greater curing said polyether.

7. A method of synthesizing a nitramine oxetane comprising providing an oxetane having the general formula:

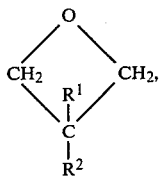

wherein at least one of $R^1$ and $R^2$ have the formula $(CH_2)_n$—$N(NO)_2$—A, wherein n is at least 1 and A is —H or an alkyl group, and $R^2$ is $(CH_2)_n$—Y wherein Y is —H, alkyl, —H, alkyl, —$N(NO_2)$—A, —$N_3$, —CN,

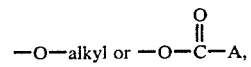

providing a nitramine salt having the general formula: $M(N(NO_2)A)_z$ (z=1-3) wherein M is a cation and A is —H or an alkyl group, and
reacting said oxetane and said nitramine salt to produce the corresponding nitramine.

8. A method according to claim 7 where z=1.

* * * * *

UNITED STATES PATENT AND TRADEMARK OFFICE
CERTIFICATE OF CORRECTION

PATENT NO. : 4,707,540            Page 1 of 2
DATED : 17 November 1987
INVENTOR(S) : Gerald E. Manser & Richard W. Fletcher It is certified that error appears in the above—identified patent and that said Letters Patent is hereby corrected as shown below:

Column 8, line 11, the formula written "$(CH_2)_4 - N(NO)_2 - A$" should read -- $(CH_2)_n - N(NO_2) - A$ --.

Column 8, line 50, the formula written "$(CH_2)_n - N(NO)_2 - A$" should read -- $(CH_2)_n - N(NO_2) - A$ --.

Column 9, line 22, the formula written "$(CH_2)_n - N(NO)_2 - A$" should read -- $(CH_2)_n - N(NO_2) - A$ --.

Column 9, line 24, delete "-H, alkyl,".

Column 10, line 11, the formula written "$(CH_2)_n - N(NO)_2 - A$" should read -- $(CH_2)_n - N(NO_2) - A$ --.

Column 10, line 20, -- and -- should be inserted before "an".

Column 10, line 35, the formula written "$(CH_2)_n - N(NO)_2 - A$" should read -- $(CH_2)_n - N(NO_2) - A$ --.

UNITED STATES PATENT AND TRADEMARK OFFICE
CERTIFICATE OF CORRECTION

PATENT NO. : 4,707,540

DATED : 17 November 1987

INVENTOR(S) : Gerald E. Manser & Richard W. Fletcher

It is certified that error appears in the above-identified patent and that said Letters Patent is hereby corrected as shown below:

Column 10, line 37, delete "-H, alkyl,".

Signed and Sealed this

Thirteenth Day of December, 1988

*Attest:*

DONALD J. QUIGG

*Attesting Officer*　　　　*Commissioner of Patents and Trademarks*